(12) United States Patent
Cho et al.

(10) Patent No.: US 8,318,376 B2
(45) Date of Patent: Nov. 27, 2012

(54) POLYMER ELECTROLYTE MEMBRANE WITH COATING LAYER OF ANION BINDING AGENT AND FUEL CELL USING SAME

(75) Inventors: Ki Yun Cho, Seoul (KR); In Chul Hwang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 1042 days.

(21) Appl. No.: 12/001,565

(22) Filed: Dec. 11, 2007

(65) Prior Publication Data

US 2009/0233144 A1    Sep. 17, 2009

(30) Foreign Application Priority Data

Aug. 27, 2007    (KR) .................. 10-2007-0086677

(51) Int. Cl.
*H01M 8/10* (2006.01)
(52) U.S. Cl. ........................................ 429/491
(58) Field of Classification Search ............ 429/491
See application file for complete search history.

(56) References Cited

U.S. PATENT DOCUMENTS

| | | | |
|---|---|---|---|
| 6,022,643 A * | 2/2000 | Lee et al. ............... | 429/324 |
| 6,544,690 B1 | 4/2003 | Harrup et al. | |
| 6,716,548 B1 * | 4/2004 | Kaliaguine et al. ...... | 429/493 |
| 2006/0269834 A1 | 11/2006 | West et al. | |
| 2006/0286425 A1 * | 12/2006 | Nakato et al. ............ | 429/33 |

FOREIGN PATENT DOCUMENTS

| | | |
|---|---|---|
| JP | 06-260187 | 9/1994 |
| JP | 06260187 A * | 9/1994 |
| JP | 2006-019070 | 1/2006 |
| JP | 2006-032276 | 2/2006 |

* cited by examiner

*Primary Examiner* — Karie O'Neill Apicella
(74) *Attorney, Agent, or Firm* — Edwards Wildman Palmer LLP; Peter F. Corless

(57) ABSTRACT

The present invention relates to a multi-layered polymer electrolyte membrane for a fuel cell, which is prepared by introducing an anion binding substance as a coating layer to a non-aqueous polymer electrolyte membrane for preventing the elution of acid, and a fuel cell comprising the membrane. In particular, the present invention discloses a multi-layered polymer electrolyte membrane prepared by coating an anion binding substance on a non-aqueous polymer electrolyte membrane, and a fuel cell comprising the membrane, thereby preventing the elution of acid and maintaining the performance of a fuel cell to economic and environmental profit.

11 Claims, 5 Drawing Sheets

POLYMER ELECTROLYTE MEMBRANE WITH COATING LAYER OF ANION BINDING AGENT AND FUEL CELL USING SAME

CROSS-REFERENCE TO RELATED APPLICATION

This application claims the benefit under 35 U.S.C. §119(a) of Korean Patent Application No. 10-2007-0086677, filed on Aug. 28, 2007, the entire contents of which are incorporated herein by reference.

TECHNICAL FIELD

The present invention relates to a multi-layered polymer electrolyte membrane for a fuel cell and a fuel cell comprising the membrane. More particularly, the present invention relates to a multi-layered polymer electrolyte membrane comprising an anion binding substance coated on the surface of a conventional non-aqueous polymer electrolyte membrane, and a fuel cell comprising the membrane, which can prevent elution of acid and improve electrochemical stability of the fuel cell.

BACKGROUND ART

In the modern society to today, main sources of energy have been fossil fuel, nuclear energy and waterpower. However, as these energy sources are being exhausted and may cause environmental problems, many countries have attempted develop an alternative energy.

Recently, as the role of an alternative energy increases due to the drastic rise in oil price and more strict environmental regulations by UNFCC (the United Nations Framework Convention on Climate Change), a fuel cell has been spotlighted as the next-generation energy source.

The fuel cell is a device that can convert chemical energy of a fuel to electric energy. Unlike others, the fuel cell is not restricted by Carnot cycle, thus showing a remarkably high efficiency and generates relatively less noise, vibration and waste gas. The fuel cell may also generate electric energy continuously as long as fuel and oxidant are supplied. Depending on the kind of electrolyte and the operation temperature, it may be divided into alkali fuel cell (AFC), phosphoric acid fuel cell (PAFC), molten carbonate fuel cell (MCFC), polymer electrolyte membrane fuel cell (PEMFC), solid oxide fuel cell (SOFC), direct methanol fuel cell (DMFC), etc.

In particular, polymer electrolyte membrane fuel cell (PEMFC) shows a rapid start-up due to a low operation temperature and is easy to manufacture using a solid electrolyte. In addition, it has superior output density and energy conversion efficiency. For these reasons, it has been intensively studied for portable, home and military uses or as an electric source of a car or an energy source for distributed generation.

FIG. 1 shows the principle of a polymer electrolyte membrane fuel cell (PEMFC). Protons produced when hydrogen is oxidized in an anode react with oxygen in a cathode, thus generating water and electricity.

Currently most popular fuel cell polymer electrolyte membrane is Nafion, which is a perfluorosulfonic acid based polymer. Nafion, however, has serious drawbacks of high price and deterioration of cell performance at a temperature of higher than 80° C. due to the decrease in proton conductivity caused by dehydration of membrane. Therefore, PEMFC, which includes an aqueous system, shows a serious deterioration of electrode deactivation due to a low operation temperature and the poisoning caused by carbon monoxide (CO). Further, this requires an additional water management for humidifying the membrane, thus decreasing the productivity of the fuel cell and preventing the commercialization of the fuel cell.

To overcome the aforementioned problems, there have been attempts made to use materials that are superior in proton conductivity, electrochemical stability and thermal stability even under a high temperature non-aqueous condition as a polymer electrolyte of a fuel cell. Among these attempts, Japanese patent application publication No. 2000-195528 discloses a method of doping phosphoric acid in polybenzimidazole-based polymer electrolyte. However, this method has a problem that water produced on a cathode causes the elution of phosphoric acid, resulting in decrease in the proton conductivity of electrolyte membrane.

Therefore, there is a need for a new non-aqueous polymer electrolyte that has a decreased price and improved high-temperature stability, salvation stability and/or electrochemical stability.

The above information disclosed in this Background Art section is only for enhancement of understanding of the background of the invention and therefore it may contain information that does not form the prior art that is already known in this country to a person of ordinary skill in the art.

SUMMARY

To overcome the aforementioned problems, the present inventors have exerted extensive researches and finally reached the present invention. One aspect of the present invention is to provide a non-aqueous polymer electrolyte membrane for a fuel cell, comprising an anion binding substance selected from the group consisting of compounds of Formulas 1, 2 and 3 as a coating layer:

$$BY \quad \text{[Formula 1]}$$

wherein Y is $PO_4$ or N;

$$BZ_3 \quad \text{[Formula 2]}$$

wherein Z is Cl, I, Br, $CH_3O$, $CF_3CH_2O$, $C_3F_7CH_2O$, $(CF_3)_2CHO$, $(CF_3)_2C(C_6H_5)O$, $(CF_3)_3CO$, $C_6H_5O$, $FC_6H_4O$, $F_2C_6H_3O$, $F_4C_6HO$, $C_6F_5O$, $CF_3C_6H_4O$, $(CF_3)_2C_6H_3O$, or $C_6F_5$; and

[Formula 3]

wherein R is $CH_3O$, $CF_3CH_2O$, $C_3F_7CH_2O$, $(CF_3)_2CHO$, $(CF_3)_2C(C_6H_5)O$, $(CF_3)_3CO$, $C_6H_5O$, $FC_6H_4O$, $F_2C_6H_3O$, $F_4C_6HO$, $C_6F_5O$, $CF_3C_6H_4O$, $(CF_3)_2C_6H_3O$ or $C_6F_5$.

Other aspects of the invention are discussed infra.

BRIEF DESCRIPTION OF DRAWINGS

The above and other features of the present invention will be described with reference to certain exemplary embodiments thereof illustrated the attached drawings in which.

DETAILED DESCRIPTION

Figure 1:
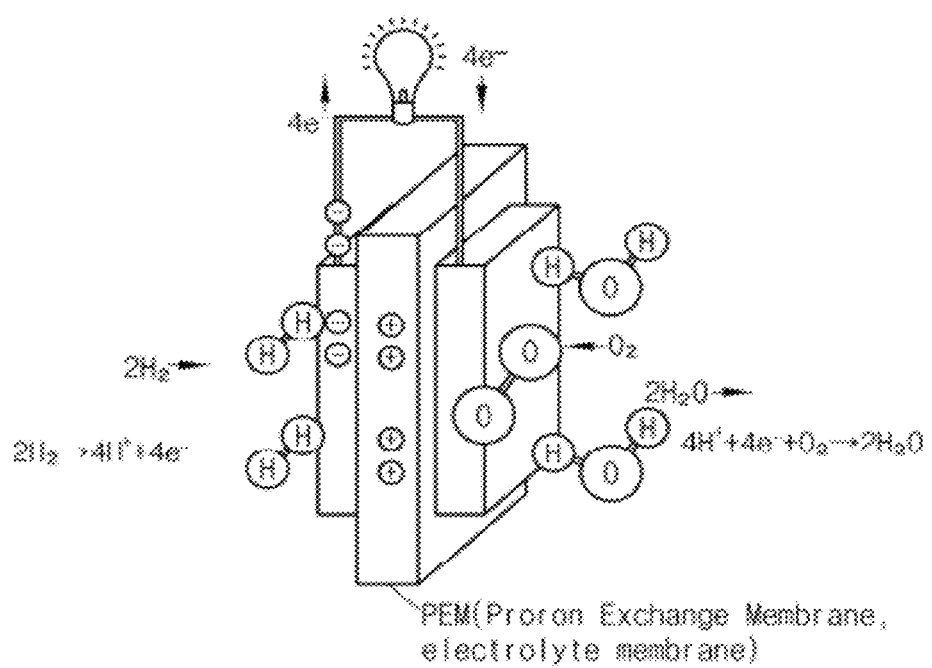
FIG. 1 schematically illustrates the structure and the operation principle of the general polymer electrolyte fuel cell (PEMFC)

Reference will now be made in detail to the preferred embodiment of the present invention, examples of which are illustrated in the drawings attached hereinafter. The embodiments are described below so as to explain the present invention by referring to the figures.

As discussed above, one aspect of the present invention provides a non-aqueous polymer electrolyte membrane for a fuel cell, comprising an anion binding substance as a coating layer on a non-aqueous polymer electrolyte membrane, thereby preventing the problem of acid elution.

Figure 2:
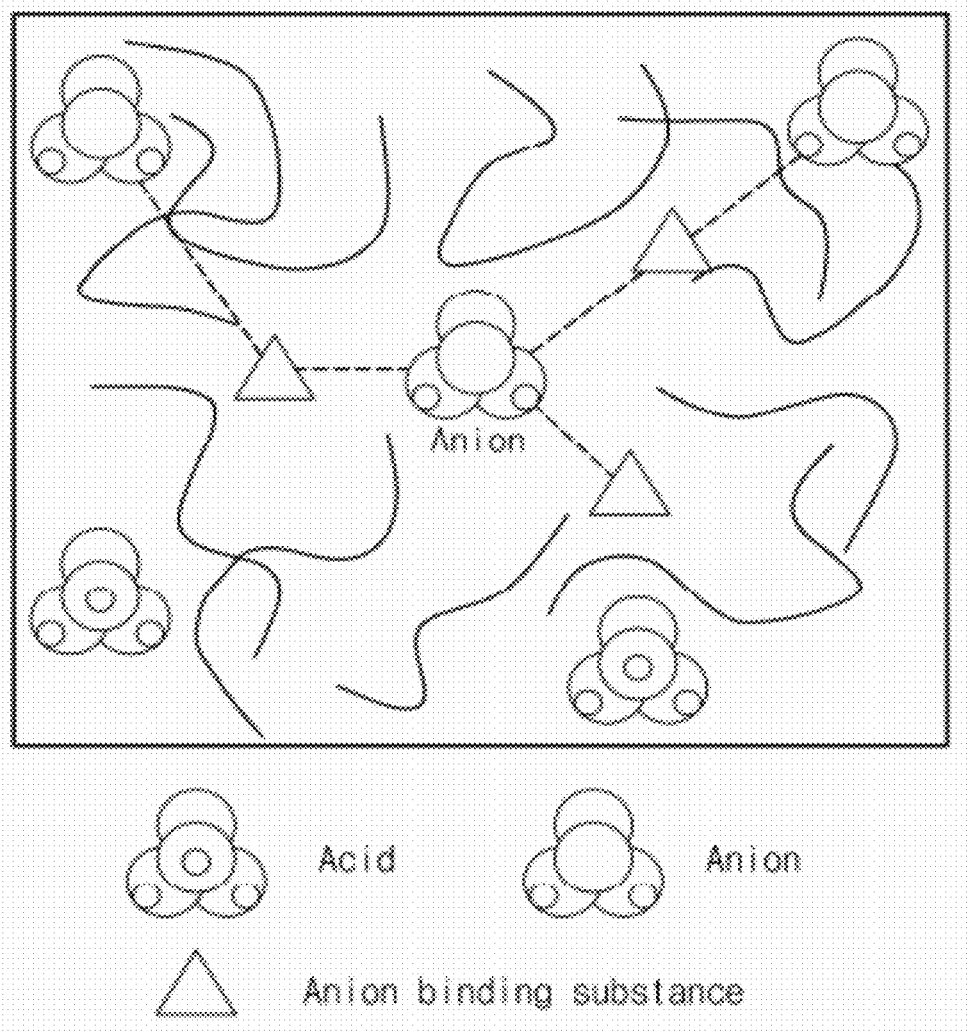
FIG. 2 schematically illustrates the structure and the operation principle of the anion binding substance herein.

As shown in FIG. 2, an anion binding substance generates anions during the dissociation of an acid, the movement of the generated anions is restricted by the ion-dipole binding with anion binding agent, thereby inhibiting the elution on a cathode caused by water.

Figure 3:
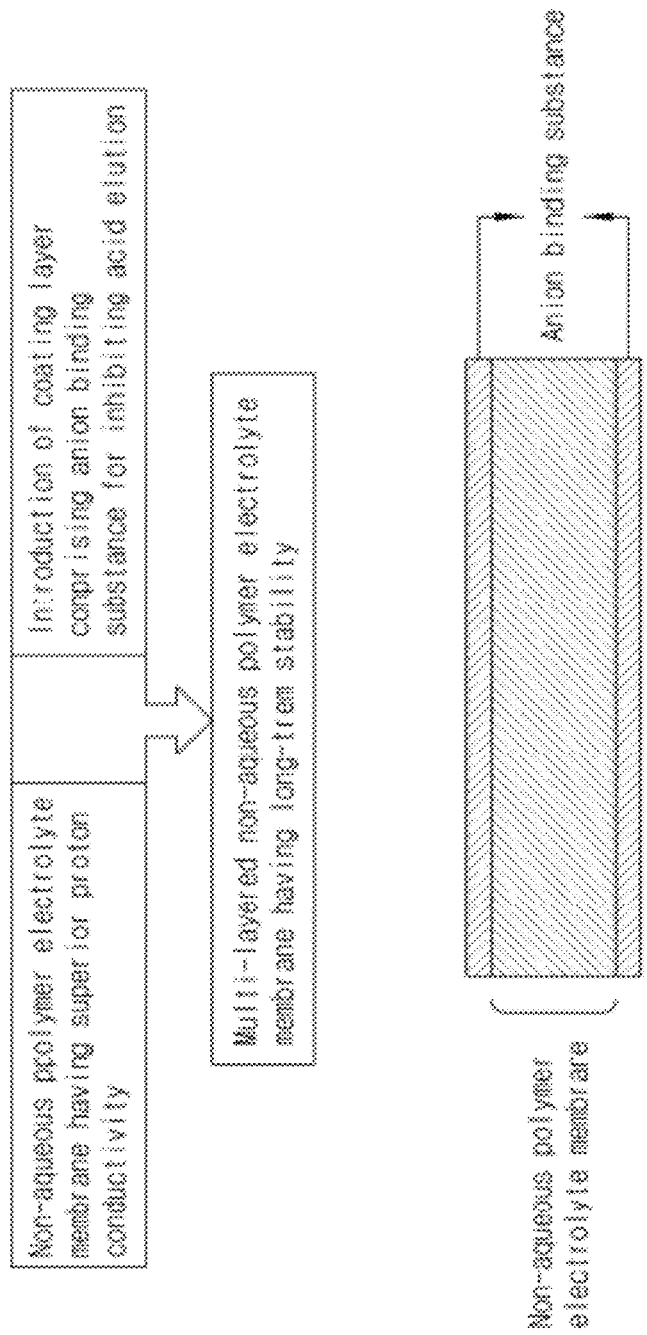
FIG. 3 shows a multi-layered polymer electrolyte membrane herein having coating layer containing an anion binding substance.

As shown in FIG. 3, the present invention prevents the elution of acid generated on a cathode of a fuel cell by introducing the anion binding substance as a coating layer, thereby providing a fuel cell having a long-term stability and economic and environmental profits.

To overcome the problem associated with the conventional non-aqueous polymer electrolyte membranes, i.e., insufficient durability due to the elution of acid, the present invention introduces an anion binding substance of Formula 1, 2 or 3 as a coating layer to the non-aqueous polymer electrolyte membrane.

BY                                               [Formula 1]

wherein Y is $PO_4$ or N.

$BZ_3$                                           [Formula 2]

wherein Z is halogen, aliphatic organic compound or aromatic organic compound such as Cl, I, Br, $CH_3O$, $CF_3CH_2O$, $C_3F_7CH_2O$, $(CF_3)_2CHO$, $(CF_3)_2C(C_6H_5)O$, $(CF_3)_3CO$, $C_6H_5O$, $FC_6H_4O$, $F_2C_6H_3O$, $F_4C_6HO$, $C_6F_5O$, $CF_3C_6H_4O$, $(CF_3)_2C_6H_3O$, or $C_6F_5$.

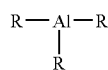
                                                 [Formula 3]

wherein R is aliphatic organic compound or aromatic organic compound such as $CH_3O$, $CF_3CH_2O$, $C_3F_7CH_2O$, $(CF_3)_2CHO$, $(CF_3)_2C(C_6H_5)O$, $(CF_3)_3CO$, $C_6H_5O$, $FC_6H_4O$, $F_2C_6H_3O$, $F_4C_6HO$, $C_6F_5O$, $CF_3C_6H_4O$, $(CF_3)_2C_6H_3O$ or $C_6F_5$.

BY                                               [Formula 1]

wherein Y is $PO_4$ or N.

$BZ_3$                                           [Formula 2]

wherein Z is halogen, aliphatic organic compound or aromatic organic compound such as Cl, I, Br, $CH_3O$, $CF_3CH_2O$, $C_3F_7CH_2O$, $(CF_3)_2CHO$, $(CF_3)_2C(C_6H_5)O$, $(CF_3)_3CO$, $C_6H_5O$, $FC_6H_4O$, $F_2C_6H_3O$, $F_4C_6HO$, $C_6F_5O$, $CF_3C_6H_4O$, $(CF_3)_2C_6H_3O$, or $C_6F_5$.

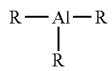
                                                 [Formula 3]

wherein R is aliphatic organic compound or aromatic organic compound such as $CH_3O$, $CF_3CH_2O$, $C_3F_7CH_2O$, $(CF_3)_2CHO$, $(CF_3)_2C(C_6H_5)O$, $(CF_3)_3CO$, $C_6H_5O$, $FC_6H_4O$, $F_2C_6H_3O$, $F_4C_6HO$, $C_6F_5O$, $CF_3C_6H_4O$, $(CF_3)_2C_6H_3O$ or $C_6F_5$.

In a preferred embodiment, the coating layer is prepared by admixing a small amount of polymer matrix and an anion binding substance to maintain the shape of the coating layer. The polymer matrix is a homo-polymer or a co-polymer selected from the group consisting of benzimidazole, benzothiazole, benzooxazole, an imide compound, a carbonate compound, and a blend thereof, wherein the homopolymer is PBI with benzimidazole or PBO with benzooxazole or PI with imide or PC with carbonate, etc., while the copolymer is PBI-co-PI or PBO-co-PI, etc. Further, the coating layer comprises, preferably, 1-95 wt % of an anion binding substance of Formula 1, 2 or 3 and 5-99 wt % of a polymer matrix relative to the total weight of the coating layer.

When the amount of the anion binding substance is less than 1 wt %, the effect of the anion binding substance is not sufficient, and it may also be difficult to apply the multi-layered membrane to proton polymer electrolyte membrane due to relatively low proton conductivity. By contrast, when the amount is higher than 95 wt %, the coating layer may not be formed. Most preferably, the anion binding substance and polymer matrix are used in the amount of 60 wt % and 40 wt %, respectively. However, the present invention is not limited to the aforementioned range.

Preferable thickness of the coating layer is 1-10 μm. When the thickness is less than 1 μm, the anion binding effect may not sufficient. When the thickness is higher than 10 μm, however, the proton conductivity may decrease with the increase in resistance, thereby lowering the performance of the cell.

A non-aqueous polymer electrolyte membrane according to the present invention comprises coating layer of a polymer electrolyte membrane for a fuel cell on a side or both sides of the non-aqueous polymer electrolyte membrane.

Further, non-aqueous polymer electrolyte membrane used in the present invention comprises 1-95 wt % of acid and 5-99 wt % of polymer matrix. The polymer matrix of the non-aqueous polymer electrolyte membrane is a homo-polymer or a co-polymer selected from the group consisting of benzimidazole, benzothiazole, benzooxazole, an imide compound, a carbonate compound, and a blend thereof, wherein the homopolymer is PBI with benzimidazole or PBO with benzooxazole or PI with imide or PC with carbonate, etc., while the copolymer is PBI-co-PI or PBO-co-PI, etc. The acid is at least one selected among phosphoric acid, acetic acid, nitric acid, sulfuric acid, formic acid, a derivative thereof and a mixture thereof.

EXAMPLES

The present invention is described more specifically by the following Examples. Examples herein are meant only to illustrate the present invention, but they should not be construed as limiting the scope of the claimed invention.

Examples 1-5

Preparation of Polymer Electrolyte Membrane Comprising Coating Layer

Figure 4:
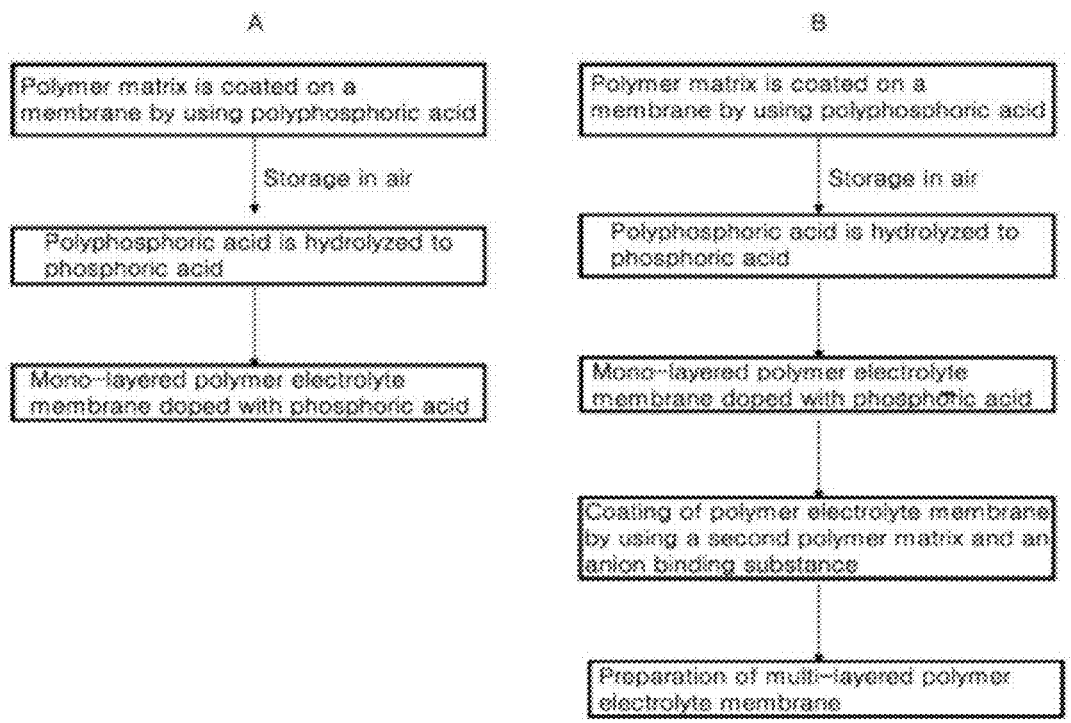
FIG. 4(A) is a process of preparing the conventional non-aqueous polymer electrolyte membrane.
FIG. 4(B) is a process of preparing a multi-layered polymer electrolyte membrane with an anion binding substance coated layer according to the present invention.

A polymer electrolyte membrane was prepared by introducing a coating layer as illustrated in FIG. 4(B). A 3-neck reactor was purged with nitrogen, and polymerization was conducted at 200° C. by adding 3,4-diamino benzoic acid monomer in a solvent, polyphosphoric acid in an amount of 5 wt % relative to the solvent.

The polymer was casted on glass plate using Doctor Blade, and placed at room temperature for more than 36 hours. The polyphosphoric acid was hydrolyzed by moisture into phosphoric acid.

A polymer electrolyte membrane for a fuel cell coated with anion binding substance was prepared by introducing a coating layer having a thickness of 3 μm, which comprises anion binding substance containing 60 wt % of $BPO_4$ and 40 wt % of PBI as a polymer matrix to this polymer electrolyte membrane. Other polymer electrolyte membranes for a fuel cell were also prepared as shown in Table 1.

Comparative Examples 1-3

As illustrated in FIG. 4(A), non-aqueous polymer electrolyte membranes without a coating layer containing anion binding substance, which have the same doping level, were prepared same as in Example 1 except that the coating layer was not coated.

TABLE 1

| Examples | Anion binding substance | Used amount | Thickness of coating layer |
|---|---|---|---|
| Ex. 1 | $BPO_4$ | 60 wt % | 3 μm |
| Ex. 2 | $BPO_4$ | 60 wt % | 1 μm |
| Ex. 3 | $BPO_4$ | 60 wt % | 10 μm |
| Ex. 4 | $BC_6H_5O$ | 42 wt % | 5 μm |
| Ex. 5 | $Al(CF_3)_2C(C_6H_5)O$ | 45 wt % | 10 μm |
| Comp. Ex. 1 | — | 0 wt % | 0 μm |
| Comp. Ex. 2 | — | 0 wt % | 1 μm |
| Comp. Ex. 3 | — | 0 wt % | 10 μm |

Experiment of Ion Conductivity and Doping Level

Experimental Example 1

A cell was prepared by stacking polymer electrolyte membrane between Teflon electrodes prepared in Example 1. Resistance of electrolyte was measured according to an AC impedance method. Ion conductivity and doping level were obtained using the resistance, and the results were presented in Table 2, Experimental Examples 2-5

Ion conductivity and doping level were obtained same as in Experimental Example 1 except that the membranes prepared in Examples 2-5 were used, and the results are presented in Table 2.

Comparative Experimental Example 1

Ion conductivity and doping level were obtained same as in Experimental Example 1 except that the membranes prepared in Comparative Example 1 was used, and the results are presented in Table 2.

Comparative Experimental Examples 2 and 3

Ion conductivity and doping level were obtained same as in Experimental Example 1 except that the membranes prepared in Comparative Examples 2-3 were used, and the results are presented in Table 2.

TABLE 2

| Examples | Doping level | Ion conductivity (150° C.) |
|---|---|---|
| Exp. Ex. 1 | 29.3 mol | $1.3 \times 10^{-1}$ S/cm |
| Exp. Ex. 2 | 29.2 mol | $2.1 \times 10^{-1}$ S/cm |
| Exp. Ex. 3 | 27.3 mol | $8.7 \times 10^{-2}$ S/cm |
| Exp. Ex. 4 | 24.0 mol | $6.4 \times 10^{-2}$ S/cm |
| Exp. Ex. 5 | 27.2 mol | $7.9 \times 10^{-2}$ S/cm |
| Comp. Exp. Ex. 1 | 28.3 mol | $3.2 \times 10^{-1}$ S/cm |
| Comp. Exp. Ex. 2 | 29.1 mol | $4.5 \times 10^{-1}$ S/cm |
| Comp. Exp. Ex. 3 | 27.5 mol | $4.2 \times 10^{-1}$ S/cm |

Measurement of Acid Elution of a Fuel Cell Prepared Using Polymer Electrolyte Membrane Comprising Coating Layer Experimental Example 4

Figure 5:
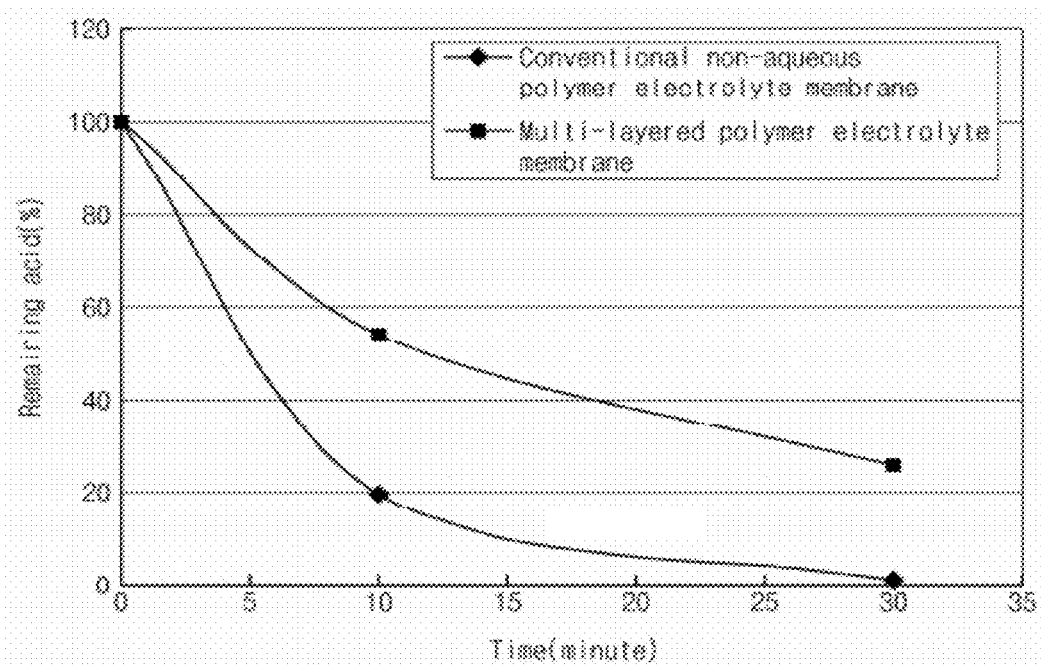
FIG. 5 shows the time dependency of phosphoric acid elution of a fuel cells comprising the polymer electrolyte membranes prepared in Example 1 and Comparative Example 1, respectively.

The anion binding property of the polymer electrolyte membrane prepared in Example 1 was observed by immersing the membrane in 80 mL of water for 30 minutes at room temperature, followed by the measurement of the elution of acid according to the titration. The results are presented in FIG. 5.

As a result, when a polymer electrolyte membrane having a coating layer was immersed in water for 10 minutes, 56% of acid remained and 44% of acid was eluted into water. The elution of acid was inhibited by 45%, thus improving the durability of a non-aqueous polymer electrolyte membrane.

TABLE 3

| Examples | Remaining acid | Elution acid | Inhibition of acid elution |
|---|---|---|---|
| Exp. Ex. 1 | 56% | 44% | 45% |
| Exp. Ex. 2 | 47% | 53% | 34% |
| Exp. Ex. 3 | 62% | 38% | 53% |
| Comp. Exp. Ex. 1 | 20% | 80% | 0% |
| Comp. Exp. Ex. 2 | 16% | 84% | −0.05% |
| Comp. Exp. Ex. 3 | 21% | 78% | 0.3% |

The inhibition of the acid elution was on the basis of the value of acid elution obtained in Comparative Experimental Example 1.

The elution of acid was remarkably reduced in Experimental Examples 2-3 as compared to Comparative Experimental Examples 1-3. Experimental Examples show that the present invention may provide a fuel cell having superior durability and a long-term stability.

In the present invention, a polymer electrolyte membrane was prepared by coating anion binding substance onto the conventional non-aqueous polymer electrolyte membrane, and a fuel cell was prepared by using the membrane, thereby preventing various problems such as the anion elution caused by water, the decrease in the proton conductivity and the inactivation of catalyst caused by the elution of acid.

Accordingly, the present invention may maintain the performance of a fuel cell to the economic and environmental profit by overcoming the aforementioned problems.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A non-aqueous polymer electrolyte membrane for a fuel cell, comprising an anion binding substance of Formula 1 as a coating layer:

BN;     [Formula 1]

wherein the coating layer comprises 1-95 wt % of an anion binding substance of Formula 1 and 5-99 wt % of a polymer matrix, and wherein the polymer matrix is a homo-polymer or a co-polymer selected from the group consisting of benzimidazole, benzothiazole, benzooxazole, an imide compound, a carbonate compound, and a blend thereof, wherein the homopolymer includes PBI with benzimidazole or PBO with benzooxazole or PI with imide or PC with carbonate, while the copolymer includes PBI-co-PI or PBO-co-PI.

2. The polymer electrolyte membrane of claim 1, wherein the coating layer has a thickness of 1-10 μm.

3. The polymer electrolyte membrane of claim 1, wherein the coating layer is coated on both sides of the non-aqueous polymer electrolyte membrane.

4. The polymer electrolyte membrane of claim 1, wherein the non-aqueous polymer electrolyte membrane comprises 1-95 wt % of an acid and 5-99 wt % of a polymer matrix.

5. The polymer electrolyte membrane of claim 4, wherein the polymer matrix is a homo-polymer or a co-polymer selected from the group consisting of benzimidazole, benzothiazole, benzooxazole, an imide compound, a carbonate compound, and a blend thereof, wherein the homopolymer includes PBI with benzimidazole or PBO with benzooxazole or PI with imide or PC with carbonate, while the copolymer includes PBI-co-PI or PBO-co-PI.

6. The polymer electrolyte membrane of claim 4, wherein the acid is at least one selected from the group consisting of phosphoric acid, acetic acid, nitric acid, sulfuric acid, formic acid, a derivative thereof and a mixture thereof.

7. A fuel cell comprising the polymer electrolyte membrane according to claim 1.

8. A non-aqueous polymer electrolyte membrane for a fuel cell, comprising an anion binding substance of Formula 1 as a coating layer:

BN,     [Formula 1]

wherein the non-aqueous polymer electrolyte membrane comprises 1-95 wt % of an acid and 5-99 wt % of a polymer matrix, and wherein the polymer matrix is a homo-polymer or a co-polymer selected from the group consisting of benzimidazole, benzothiazole, benzooxazole, an imide compound, a carbonate compound, and a blend thereof, wherein the homopolymer includes PBI with benzimidazole or PBO with benzooxazole or PI with imide or PC with carbonate, while the copolymer includes PBI-co-PI or PBO-co-PI.

9. The polymer electrolyte membrane of claim 8, wherein the coating layer has a thickness of 1-10 μm.

10. The polymer electrolyte membrane of claim 8, wherein the coating layer is coated on both sides of the non-aqueous polymer electrolyte membrane.

11. A fuel cell comprising the polymer electrolyte membrane according to claim 8.

* * * * *